(12) United States Patent
Hartmann et al.

(10) Patent No.: US 10,456,979 B2
(45) Date of Patent: Oct. 29, 2019

(54) OPTIMIZATION OF A PRODUCTION PROCESS

(71) Applicant: SIEMENS AKTIENGESELLSCHAFT, München (DE)

(72) Inventors: Dirk Hartmann, Assling (DE); Philipp Emanuel Stelzig, Kammlach (DE); Utz Wever, Munich (DE); Roland Gersch, Munich (DE)

(73) Assignee: Siemens Aktiengesellschaft, München (DE)

( * ) Notice: Subject to any disclaimer, the term of this patent is extended or adjusted under 35 U.S.C. 154(b) by 402 days.

(21) Appl. No.: 14/787,153

(22) PCT Filed: Apr. 8, 2014

(86) PCT No.: PCT/EP2014/057026
§ 371 (c)(1),
(2) Date: Oct. 26, 2015

(87) PCT Pub. No.: WO2014/173674
PCT Pub. Date: Oct. 30, 2014

(65) Prior Publication Data
US 2016/0107393 A1    Apr. 21, 2016

(30) Foreign Application Priority Data
Apr. 26, 2013    (DE) ......... 10 2013 207 656

(51) Int. Cl.
*G05B 19/4099*    (2006.01)
*B29C 64/386*    (2017.01)
(Continued)

(52) U.S. Cl.
CPC ........ *B29C 64/386* (2017.08); *G05B 19/4099* (2013.01); *B22F 3/1055* (2013.01);
(Continued)

(58) Field of Classification Search
None
See application file for complete search history.

(56) References Cited

U.S. PATENT DOCUMENTS

2009/0326706 A1    12/2009    Fink et al.
2010/0174392 A1    7/2010    Fink et al.
(Continued)

FOREIGN PATENT DOCUMENTS

CN    101382794 A    3/2009
DE    89 16 157    5/1994
(Continued)

OTHER PUBLICATIONS

Chinese Office Action for Chinese Patent Application No. 201480023588.0 dated Apr. 19, 2017, with English Translation.
(Continued)

*Primary Examiner* — Mohammad Ali
*Assistant Examiner* — Vincent W Chang
(74) *Attorney, Agent, or Firm* — Lempia Summerfield Katz LLC

(57) ABSTRACT

A method (1) for optimizing a production process for a component (20, 32) that is to be manufactured by additive manufacturing by means of simulation (2) of the production process (50) includes: a) ascertaining a position of the component (20, 32) in a production space that has been optimized according to a process optimization criterion (7); b) calculating displacements and/or stresses in the component (20, 32) that can be caused by the production process (50); c) ascertaining supporting structures (31) that counteract the displacements and/or stresses that have been optimized according to the process optimization criterion (7); and d) ascertaining at least a portion of the design of the component (20, 32) that has been optimized according to a component optimization criterion (8).

18 Claims, 3 Drawing Sheets

(51) Int. Cl.
   *B33Y 50/02* (2015.01)
   *B22F 3/105* (2006.01)

(52) U.S. Cl.
   CPC .............. *B22F 2003/1057* (2013.01); *B22F 2003/1058* (2013.01); *B33Y 50/02* (2014.12); *G05B 2219/35134* (2013.01); *G05B 2219/49007* (2013.01); *G05B 2219/49029* (2013.01); *G05B 2219/49038* (2013.01); *G05B 2219/49039* (2013.01); *Y02P 80/40* (2015.11); *Y02P 90/265* (2015.11)

(56) References Cited

U.S. PATENT DOCUMENTS

| | | | | |
|---|---|---|---|---|
| 2010/0228369 | A1* | 9/2010 | Eggers | G06T 17/10 700/98 |
| 2013/0066812 | A1* | 3/2013 | Nehme | B29C 67/0088 705/400 |
| 2014/0039659 | A1* | 2/2014 | Boyer | B33Y 10/00 700/98 |

FOREIGN PATENT DOCUMENTS

| | | |
|---|---|---|
| EP | 1 486 317 | 12/2004 |
| EP | 2198405 B1 | 3/2011 |

OTHER PUBLICATIONS

He Xinying et al. "Research on Support Automatically Generation Technology in Fused Deposition Modeling" Machine Tool & Hydraulics, vol. 40 No. 4; 2012.

Hong Jun et.al.; "Design of RP Support Structure"; Journal of Xi'an Jiaotong University; vol. 34; No. 9; 2000.

International Preliminary Report on Patentability dated Oct. 27, 2015.

Danjou, S. et al.—Ermittlung optimaler Bauteilorientierung zur Verbesserung der Prozessplanung in der CAD/RP-Kette—RT Forum fur Rapid Technologie, eJournal, 6 (2009)—http://rtejournal.de/ausgabe6/2210/view.

Hartmann, W. et al.—Anforderungen und Randbedingungen fur den Einsatz optisher Messysteme zur In-Line-Prufung additiv gefertigter Bauteile—RT Forum fur Rapid Technologie, eJournal, 9 (2012), http://www.rtejournal.de/ausgabe9/3327.

International Search Report.

German Examination Report.

* cited by examiner

OPTIMIZATION OF A PRODUCTION PROCESS

BACKGROUND

1. Field of the Invention

The present invention relates to the technical field of additive manufacturing, in particular the optimization of a production process for a component to be produced by additive manufacturing, by means of a simulation of the production process.

2. Description of the Related Art

Additive manufacturing (AM) is a manufacturing method that is becoming increasingly important. Machines for producing components which meet industrial standards have in the meantime become commercially available. It is anticipated that in the coming years, these machines will replace conventional production processes in many sectors.

In contrast to subtractive methods, production processes based on AM build up the object by the successive addition of material. In the process, a noncohesive material is applied in layers in a production space (also referred to as a fabrication space, construction space, or space), and in each case the components which make up the part to be produced are cohesively joined together. Thus, in stereographic methods, synthetic resin baths are used which may be hardened in layers using a UV light beam, and in laser sinter methods, pulverized powder is welded together in layers.

A typical design process 100 for a component to be produced by additive manufacturing is illustrated in FIG. 1. Based on the predefined geometric design 102, design changes in the internal structure may be made in a method step 104. A cyclical iteration by means of analysis, simulation, and optimization methods 108, based on redesign cycles 106, often takes place here. After this product design process 101, the actual production process 110 begins with design of the production method 112, i.e., how the 3D printer is to be configured for the production, and which design (together with any supporting structures) is ultimately produced. A design for supporting structures is created in method step 114. A cyclical iteration by means of a data integrity check 118, based on redesign cycles 115, often takes place here.

In an AM machine process 120, slice generation is performed in method step 116, and AM process parameters are determined in method step 119. Machine process control data are generated from the generated slices 116 and the AM process parameters 119 in method step 122, on the basis of which the AM product 130 may be produced in the 3D printer.

In the production of high-quality components, which are required in many industrial products, three key challenges arise in the planning of the production process: First, the selection of the machine parameters of the 3D printer, such as the intensity of the laser, determines the quality of the components, for example the durability. However, the precise selection of the machine parameters is not trivial, and in many cases requires a great deal of experience as well as multiple iteration cycles in order to identify the optimal machine parameters. Second, the powder and the component to be produced have different densities, so that supporting structures must be additionally inserted in order to guarantee the required accuracies of the component. For geometrically complex structures, partial areas of a nevertheless cohesive object which are not supported in the gravitational direction by the object itself, but, rather, which subject the object to tension in the gravitational direction on a suspended material overhang, are frequently observed (comparable, for example, to a mast having a downwardly pointing boom). During slice generation, this results in noncohesive cross sections in these types of objects, which in the powder bath would initially not be supported by underlying portions of the actual geometry, and during the production would thus rest only on noncohesive powder. In practice, such situations may also be avoided by adding additional supporting structures. These additional supporting structures result in consumption of extra material, as well as a further machining step in which they must be removed. The selection of the supporting structures and the precise placement of the component to be produced (which ultimately implicitly determines the number of necessary supporting structures) also requires a great level of effort, a wealth of experience, and often, multiple iteration cycles. Third, an unfavorable selection of supporting structures may have an adverse effect on the quality of the component in such a way that production-induced residual stresses in the supporting structures flow into the actual component, resulting in permanent parasitic deformations.

Heretofore, the exact placement/orientation of the component and supporting structures has been carried out manually. The outcome cannot be assessed until after production.

The challenges have thus far been addressed by a manual approach. Automation of the derivation of optimal process parameters has been proposed in "Optimal dimensional and mechanical properties of laser sintered hardware by thermal analysis and parameter optimization" (U.S. 2009/0326706 A1).

On account of the manual approach to these three challenges, a considerable amount of time has been lost from development, up through production, of the actual component. However, the size of the object to be produced by additive manufacturing is increased by unnecessarily large supporting structures, which likewise slows down the actual production process.

Conventional software for automatically generating supporting structures identifies, based on a given criteria catalog, for example angles of surfaces, a surface that requires support. However, the supporting material itself is not optimized with regard to the material used; essentially, simple columns are formed.

Since supporting structures require post-machining (removal using subtractive methods), designs which require (many) supporting structures are not advantageous, in particular when the areas in which supporting structures are needed are not easily accessible.

The object of the invention, therefore, is to overcome these disadvantages.

This object is achieved by the approaches described in the independent claims. Advantageous embodiments of the invention are set forth in the further claims.

SUMMARY

According to one aspect, the invention relates to a method for optimizing a production process for a component to be produced by additive manufacturing. The method is carried out by a simulation of the production process. Predetermined required properties of the component are specified as boundary conditions of the simulation. The method includes the following method steps which are carried out within the scope of the simulation:

In one method step, a position of the component in a production space which is optimized according to a process optimization criterion is determined. In another method step, dislocations of and/or stresses on the component which may be caused by the production process are computed. In another method step, supporting structures are determined which counteract the dislocations and/or stresses. The supporting structures are thus optimized according to the process optimization criterion. In yet another method step, at least a portion of the design of the component that is optimized according to a component optimization criterion is determined.

According to a further aspect, the invention relates to a system which includes means that are adapted for carrying out any method encompassed by the claims.

Embodiments of the invention are explained in greater detail below by way of example, with reference to the figures.

DETAILED DESCRIPTION

Figure 1:
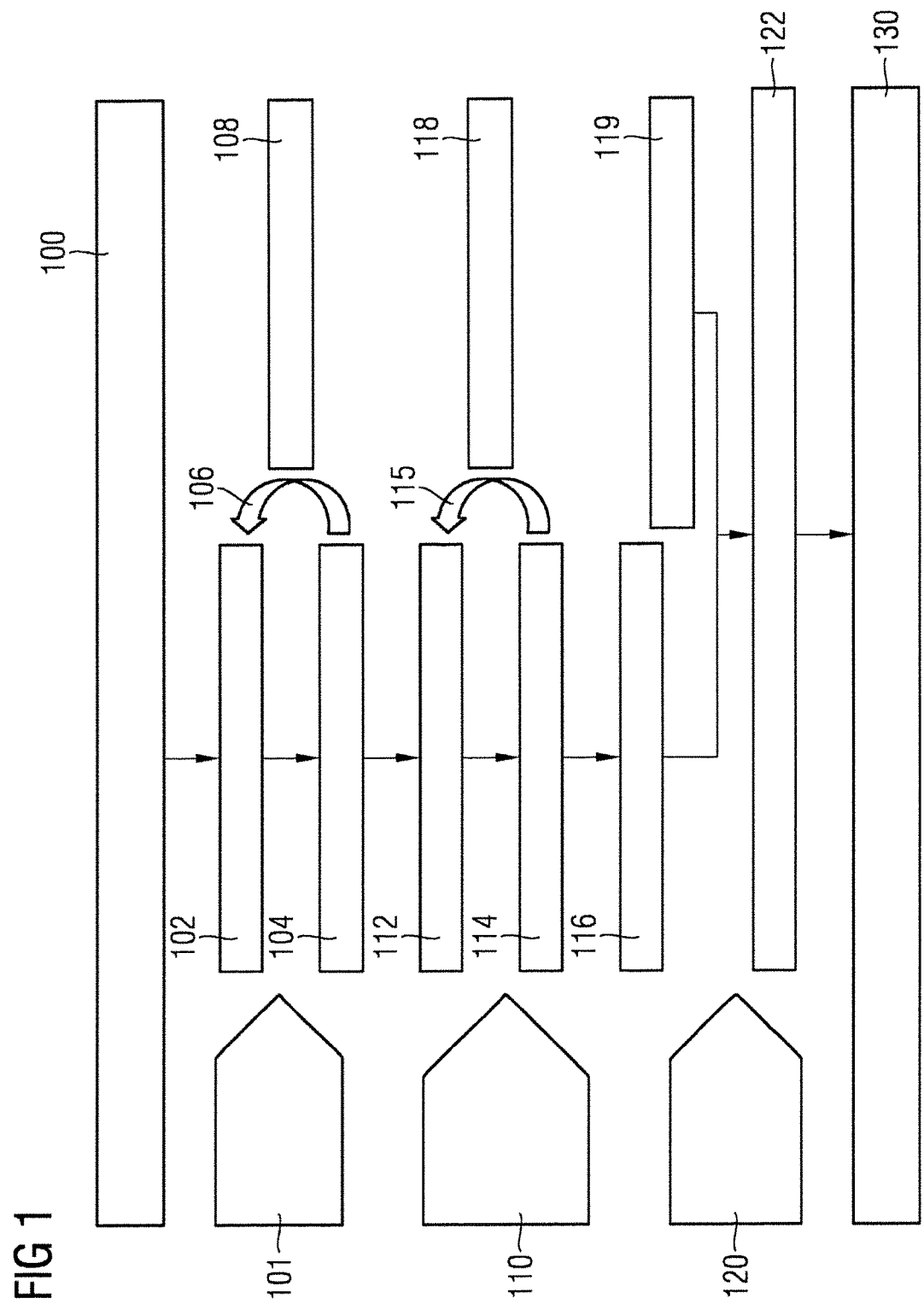
FIG. 1 shows a representative process of a component production, using a 3D printer.
Figure 2:
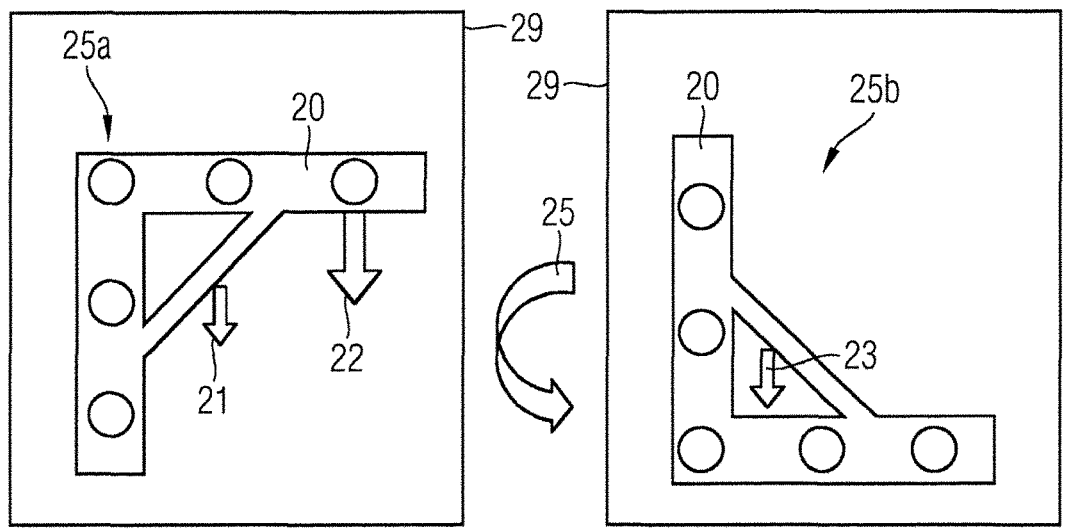
FIG. 2 shows a component which, by rotations in space, is placed in such a way that the dislocations due to the influence of gravity are reduced to a minimum.

FIG. 2 illustrates an exemplary embodiment for optimized positioning of the component 20 in the production space 29, which reduces the dislocations due to gravity 21, 22, 23 to a minimum. The computation may be made using a classical optimization method, for example the Nelder-Mead method. However, any other nonlinear optimization method is also suitable. FIG. 2 shows a component 20 which, starting from a first position 25a, via rotations 25 in space is placed in a second position 25b in such a way that dislocations due to gravitational influences 21, 22, 23 are reduced to a minimum. This results in minimal use of additional material for supporting structures.

Figure 3:
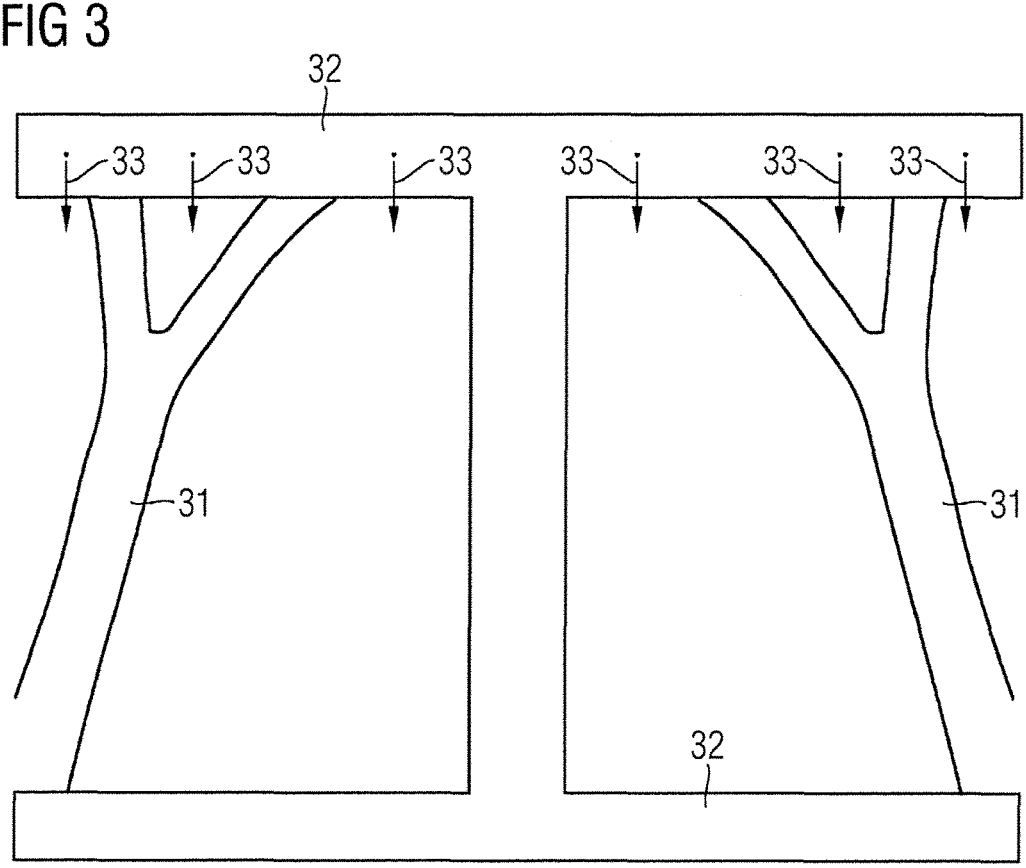
FIG. 3 shows an example of an automatically generated supporting structure for a beam.

FIG. 3 shows an exemplary embodiment for an automatically generated supporting structure 31 for a further component 32 designed as a beam. By introducing the supporting structure 31, deformations due to differences in density in welded material and bulk material may be prevented, and the beam 32 is obtained with the required accuracy. The computation has been carried out here using the solid isotropic material with penalization (SIMP) method. However, the computation may also take place using other methods (for example, level set methods).

In the specific case illustrated in FIG. 3, the supporting structures 31 have been generated as follows:
creating the geometry of the T-beam 32 in a CAD program
defining the construction space (in this case, a 2D box) and the gravitational direction 33.
automatically computing supporting structures 31, by means of topology optimization (SIMP method), which generates the supporting structures 31 with minimal material.

The structure may now be automatically converted into an appropriate data format (STL, for example) and printed using a 3D printer.

Figure 4:
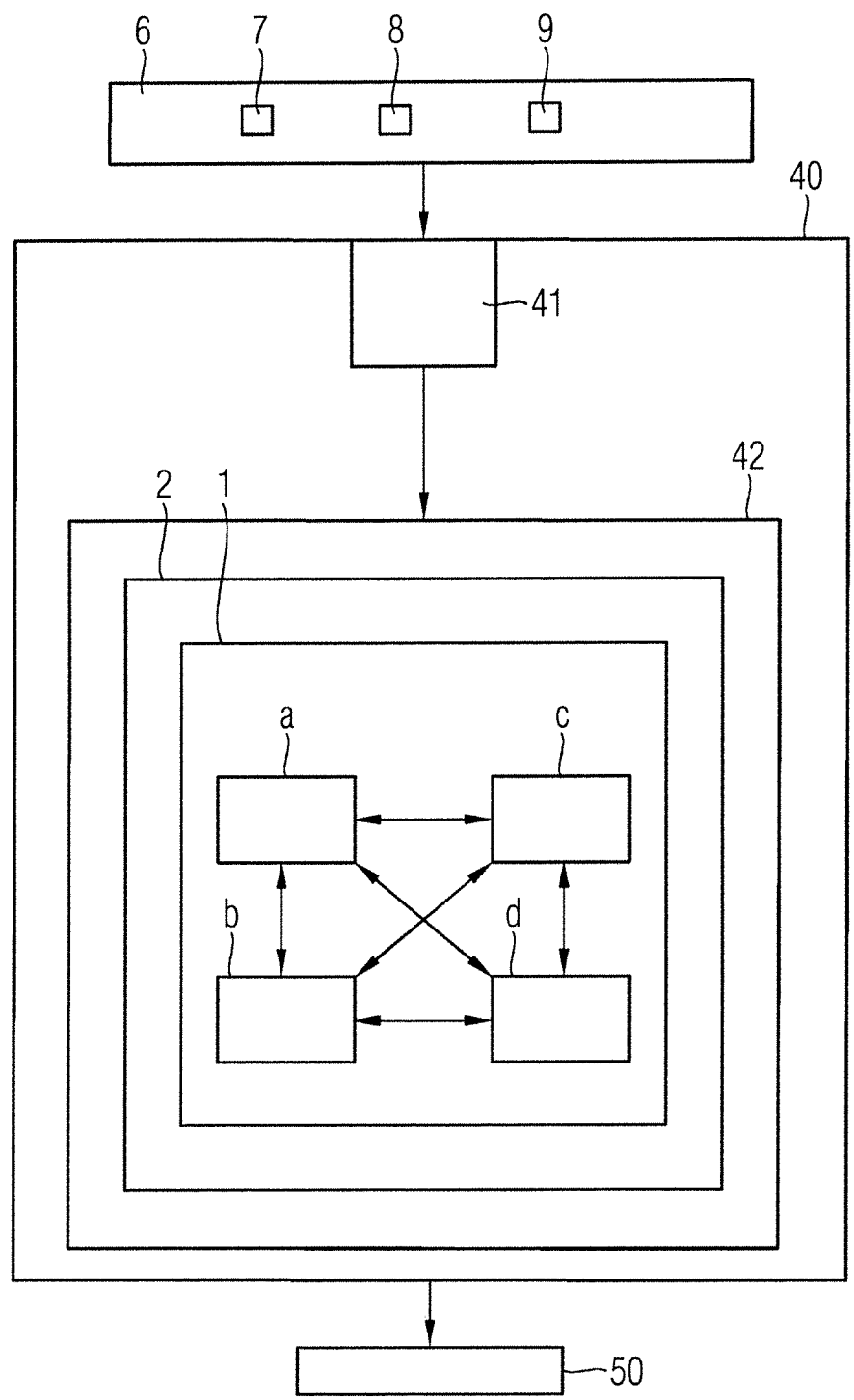
FIG. 4 shows embodiments of the system according to the invention and the method according to the invention.

FIG. 4 illustrates embodiments of the system according to the invention and the method according to the invention.

FIG. 4 shows a system 40 for optimizing a production process 50 for a component to be produced in a production space by means of additive manufacturing, for example component 20 or 32 in a production space 29. The system 40 includes an interface 41 and a simulation means 42. The simulation means 42 is adapted for carrying out a simulation 2 of the production process 50 for the component to be produced. As simulation means 42, the system 40 thus includes means which are adapted for carrying out a method according to embodiments of the invention.

In a typical starting situation, required properties of the component, such as length of the component, ends for fastening the component, or a required load-bearing strength of the component, are predetermined. The predetermined required properties are input via the interface 41 into the simulation means 42 as boundary conditions 9 for the simulation 2. Other properties, in particular at least a portion of the design of the component, i.e., at least a portion of the topology of the component, are not predetermined at the start, and instead may be selected. In addition to the boundary conditions 9, inputs 6, for example a process optimization criterion 7 and/or a component optimization criterion 8, may be transmitted to the simulation means 42. However, the process optimization criterion 7 and/or the component optimization criterion 8 may also be a fixed integral part of the simulation means which is not input.

In order to optimize the production process 50 of the component to be produced, or to automatically determine optimized supporting structures for the component, a method 1 is carried out on the simulation means 42. The method 1 includes the method steps a, b, c, d. The method steps a, b, c, d are carried out within the scope of the simulation 2.

In method step a, a position of the component 20, 32 which is optimized according to the process optimization criterion 7 is determined in the production space.

Shifts of and/or stresses on the component 20, 32 which may be caused by the production process 50 are computed in method step b. These dislocations and/or stresses may be caused, for example, by gravitational forces 21, 22, 23, 33 and/or by temperature-related changes in density of a material to be used for production of the component 20, 32.

Supporting structures 31 are determined in method step c. The supporting structures 31 counteract the dislocations and/or stresses.

In method step d, at least a portion of the design of the component 20, 32 is determined which is optimized according to the component optimization criterion 8.

An optimization with regard to the design of the component 20, 32 and of the production process 50 of the component is preferably carried out in a linked manner and/or jointly and/or simultaneously.

The method steps a, b, c, and d do not have to be carried out in this sequence, and instead may be carried out in a variety of sequences, or even simultaneously, iteratively, and/or in a linked manner. According to preferred embodiments, any given selection of the method steps a, b, c, and d is therefore carried out iteratively and/or in a linked manner. The method is preferably designed in such a way that all method steps a, b, c, and d are carried out iteratively and/or in a linked manner while the simulation is being performed.

According to further embodiments, the component optimization criterion 8 and the process optimization criterion 7 are different. For example, according to one preferred embodiment, the purpose of the component optimization criterion 8 is a functional design of the component 20, 32, while the purpose of the process optimization criterion 7 is to seek a cost-effective design of the production process 50.

According to further preferred embodiments, the purpose of the process optimization criterion 7 is to minimize dislocations during the production process 50.

According to further preferred embodiments, the purpose of the process optimization criterion 7 is to minimize the mass of the supporting structures 31, preferably for a given maximum tolerance of the component 20, 32 to be produced.

According to further preferred embodiments, the purpose of the process optimization criterion 7 is to minimize the deviations for a given maximum allowable mass of the supporting structures 31. One of the boundary conditions 9 is preferably that supporting structures 31 can be produced only in defined partial areas. Minimizing the deviations allows a reduction in the manufacturing tolerances.

According to further preferred embodiments, the purpose of the process optimization criterion 7 is to minimize the number of supporting structures 31.

According to further embodiments, the component optimization criterion 8 and the process optimization criterion 7 are weighted. The relevance of the two criteria may thus be taken into account.

According to further embodiments, the method 1 includes an adaptation of the design of the component 20, 32 to the process optimization criterion 7. The component may thus be selected in such a way that, for example, its production becomes more cost-effective, or that fewer supporting structures are needed for its production.

According to further embodiments, at least one selection of the method steps a, b, c, and d is carried out for different designs of the component 20, 32.

According to further embodiments, the method 1 includes the method step of determining a production process 50 based on the determined optimized position 25b of the component 20, 32 in the production space and the determined optimized supporting structures 31.

According to further embodiments, the method 1 includes the method step of carrying out the production process 50 based on the determined optimized position 25b of the component 20, 32 in the production space and the determined optimized supporting structures 31. For this purpose, the system 40 may be designed as a 3D printer or may include a 3D printer.

According to further embodiments, the system 40 is a computer or a computer-readable medium on which the method 1 is implemented. For the production of the component, the production process 50 which is optimized by means of the method 1 may be transmitted to a 3D printer.

According to further embodiments, an instantaneous state of the component 20, 32 is detected by means of at least one sensor while carrying out the production process 50. The production process 50, based on the simulation 2 and/or on further simulations, is automatically adapted to the component optimization criterion 8 and/or to the process optimization criterion 7, depending on the detected state.

According to further embodiments, the method 1 includes automatic positioning and rotation of the component 20, 32 by means of mathematical optimization methods.

According to preferred embodiments of the invention, a method for 3D printers is proposed which automatically determines an optimal placement and correspondingly generates optimal supporting structures 31. It is necessary to deliver to the 3D printer only the design to be produced, and all adaptations of the production process are automatically made.

Preferred embodiments of the invention are based on the following technical features:

Simulating the production process or the deformations and production-induced stresses on the component to be fabricated during the production, and thus, the accuracies to be expected.

Computing the dislocations of the component caused by the gravitational forces 21, 22, 23, 33 by simulation, and computing the optimal position in space which results in minimal dislocations. The result is minimal material use for additional supporting structures during the production process (see FIG. 2).

Optimizing the production process/the orientation and selection of the supporting structures, based on simulations. The optimization may track various criteria for the optimization, such as minimizing the mass of additional supporting structures for a given maximum tolerance of the component to be produced, or minimizing the tolerance for a given maximum allowable mass of the supporting structures, and defined partial areas in which supporting structures are allowed to be produced (taking into account the required accessibility of the supporting structures, which must be mechanically removed).

Implementing the two substeps in an automation module within the control unit of the machine, or in an automation step which is prestored therein.

In one advantageous embodiment, sensors detect the instantaneous state, such as produced geometry/deformations, for example, and automatically adapt the production process based on simulations and optimization methods, corresponding to the sensor information.

According to embodiments of the invention, the material required for the supporting structures may be reduced by means of topology optimization. This is of major importance, in particular for costly materials. In addition, by inserting appropriate predetermined breaking points, the material may be more easily removed due to the smaller volume. The surfaces which must be supported are selected according to the same scheme as in the conventional software.

According to embodiments of the invention, with regard to an optimization of the design process for additive manufacturing by means of topology optimization, a design may be achieved which manages with a "minimal" number of supporting structures. After each design step, surfaces which require a supporting structure are automatically recognized (according to the method of the prior art). The optimization method automatically applies forces to these surfaces, which in a topology optimization step then result in a design which requires fewer supporting structures. The designer then obtains feedback for an optimized design which requires fewer supporting structures, and may automatically make appropriate changes to the original design him/herself, or may have these automatically made. An optimization with regard to design and production criteria thus takes simultaneously, unlike in the situation heretofore, in which an optimization with regard to design takes place first, followed by appropriate generation of supporting structures.

In addition, automatic positioning and rotation of the component may be provided by means of mathematical optimization methods. It may thus be ensured that a minimal number of supporting structures is required for a given design. An iterative procedure with adaptation of the design is advantageous here, so that a combination results in a component that requires a minimal number of supporting structures. This is optimal not only for the design, but also the production effort.

According to embodiments of the invention, the method includes generation of supporting structures that are easy to remove. If supporting structures are unavoidable despite optimization, these supporting structures should be provided using an easily reversible method, for example using a heat-resistant adhesive which decomposes under the influence of UV radiation or the influence of chemicals. These supporting structures may thus be removed without great effort.

According to embodiments of the invention, supporting structures may be avoided by rotating the construction platform. An optimal rotation may likewise be computed here using mathematical methods, it being necessary to take into account the behavior of the particles already present in the construction space. The latter may be determined very well using particle methods, so that mathematical optimization is possible. However, fixing particles using easily reversible methods would also be advantageous here. Thus, an optimization of supporting structures with a movable construction platform may be provided (here as well, as opposed to the architecture).

An automated approach offers numerous advantages as well as the option for complete process automation, for example for a method for automated generation of supporting structures in 3D printers.

According to embodiments of the invention, as the result of an automated approach, supporting structures are automatically generated, and an optimal position of the component to be produced is automatically selected.

According to embodiments of the invention, an automatic topology optimization for generating supporting structures and an automatic optimization of the placement of the component to be produced are used.

According to embodiments of the invention, a module is proposed which allows complete automation of the production process for high-quality parts (in particular single parts). On the one hand, development loops are thus reduced, since the quality of the parts based on simulations is already predicted prior to production, and is optimally adapted. On the other hand, a separation of design and production is more easily achieved due to the automation, since the design is automatically adapted to obtain optimal quality and accuracy.

The invention claimed is:

1. A method for optimizing a production process for a component to be produced by additive manufacturing, by simulating the production process, wherein predetermined required properties of the component are specified as boundary conditions of the simulation, the method comprising:
   determining a position of the component in a production space optimized based on a process optimization criterion, wherein the position of the component is automatically determined such that dislocations of the component due to gravitational forces are minimized;
   computing dislocations of the component and stresses on the component caused by the production process, wherein the dislocations, the stresses, or the dislocations and the stresses caused by the production process are caused by gravitational forces, changes in density of a material to be used for production of the component, or gravitational forces and changes in density of the material to be used for production of the component, wherein computing dislocations of the component comprises calculating displacements or shifts of the component, and wherein computing stresses on the component comprises calculating temperature-related changes in density of the material to be used for production of the component;
   determining supporting structures optimized based on the process optimization criterion, wherein the supporting structures counteract the dislocations, the stresses, or the dislocations and the stresses;
   determining a portion of the design of the component optimized based on a component optimization criterion; and
   producing the component via the production process based on the determined optimized position of the component in the production space and the determined optimized supporting structures.

2. The method of claim 1, wherein an optimization with regard to the design of the component and of the production process of the component is carried out in a linked manner, jointly, simultaneously, or any combination thereof.

3. The method of claim 1, wherein the determining of the position of the component, the computing, the determining of the supporting structures, the determining of the portion of the design of the component, or any combination thereof is carried out iteratively, in a linked manner, or iteratively and in a linked manner.

4. The method of claim 1, wherein the component optimization criterion and the process optimization criterion are different.

5. The method of claim 1, wherein the component optimization criterion and the process optimization criterion are weighted.

6. The method of claim 1, wherein the component optimization criterion includes a functional design of the component, and the process optimization criterion includes a cost-effective design of the production process.

7. The method of claim 1, further comprising adapting the design of the component to the process optimization criterion.

8. The method of claim 1, wherein the process optimization criterion includes minimization of dislocations during the production process.

9. The method of claim 1, wherein the process optimization criterion includes minimization of a mass of the supporting structures for a given maximum tolerance of the component to be produced.

10. The method of claim 1, wherein the process optimization criterion includes minimization of deviations for a given maximum allowable mass of the supporting structures.

11. The method of claim 10, wherein one of the boundary conditions includes that the supporting structures are producible only in defined partial areas.

12. The method of claim 1, wherein the process optimization criterion includes minimization of the number of supporting structures.

13. The method of claim 1, wherein the determining of the position of the component, the computing, the determining of the supporting structures, the determining of the portion of the design of the component, or any combination thereof is carried out for different designs of the component.

14. The method of claim 1, further comprising determining a production process based on a determined optimized position of the component in the production space and the determined optimized supporting structures.

15. The method of claim 1, wherein an instantaneous state of the component is detected by at least one sensor while carrying out the production process, wherein the production process, based on the simulation, based on further simulations, or based on the simulation and on further simulations, is automatically adapted to the component optimization criterion, the process optimization criterion, or the component optimization criterion and the process optimization criterion depending on the detected state.

16. The method of claim 1, further comprising automatically positioning and rotating the component mathematical optimization methods.

17. A non-transitory computer-readable medium encoded with executable instructions that, when executed, cause one or more data processing systems to optimize a production process for a component to be produced by additive manufacturing, by simulating the production process, wherein predetermined required properties of the component are specified as boundary conditions of the simulation, the executable instructions comprising:

determining a position of the component in a production space optimized based on a process optimization criterion, wherein the position of the component is automatically determined such that dislocations of the component due to gravitational forces are minimized;

computing dislocations of the component and stresses on the component caused by the production process, wherein the dislocations, the stresses, or the dislocations and the stresses caused by the production process are caused by gravitational forces, changes in density of a material to be used for production of the component, or gravitational forces and changes in density of the material to be used for production of the component, wherein computing dislocations of the component comprises calculating displacements or shifts of the component, and wherein computing stresses on the component comprises calculating temperature-related changes in density of the material to be used for production of the component;

determining supporting structures optimized based on the process optimization criterion, wherein the supporting structures counteract the dislocations, the stresses, or the dislocations and the stresses;

determining a portion of the design of the component optimized based on a component optimization criterion; and producing the component via the production process based on the determined optimized position of the component in the production space and the determined optimized supporting structures.

18. The non-transitory computer-readable medium of claim 17, wherein the non-transitory computer-readable medium is a non-transitory computer-readable medium of a 3D printer.

* * * * *